US008769523B2

(12) United States Patent
Wahoske et al.

(10) Patent No.: US 8,769,523 B2
(45) Date of Patent: Jul. 1, 2014

(54) SYSTEMS AND METHODS FOR INTERRUPTING UPGRADES OF CONTENT DISTRIBUTION SYSTEMS

(75) Inventors: Matthew J. Wahoske, Fishers, IN (US); Manikandan Dhanuskodi, Indianapolis, IN (US)

(73) Assignee: Thomson Licensing, Boulogne-Billacourt (FR)

( * ) Notice: Subject to any disclaimer, the term of this patent is extended or adjusted under 35 U.S.C. 154(b) by 281 days.

(21) Appl. No.: 13/138,092

(22) PCT Filed: Sep. 1, 2009

(86) PCT No.: PCT/US2009/004957
§ 371 (c)(1),
(2), (4) Date: Jul. 5, 2011

(87) PCT Pub. No.: WO2010/080087
PCT Pub. Date: Jul. 15, 2010

(65) Prior Publication Data
US 2011/0271271 A1 Nov. 3, 2011

Related U.S. Application Data

(60) Provisional application No. 61/204,873, filed on Jan. 12, 2009.

(51) Int. Cl.
*G06F 9/44* (2006.01)
(52) U.S. Cl.
USPC .......................................................... 717/173
(58) Field of Classification Search
USPC .......................................................... 717/173
See application file for complete search history.

(56) References Cited

U.S. PATENT DOCUMENTS

| 6,367,077 | B1 * | 4/2002 | Brodersen et al. | 717/170 |
| 7,000,220 | B1 * | 2/2006 | Booth | 717/110 |
| 7,165,250 | B2 * | 1/2007 | Lyons | 717/177 |
| 8,191,061 | B2 * | 5/2012 | Jun et al. | 717/178 |
| 8,453,138 | B2 * | 5/2013 | Meller et al. | 717/170 |
| 2002/0092010 | A1 * | 7/2002 | Fiske | 717/168 |

(Continued)

FOREIGN PATENT DOCUMENTS

| WO | WO03025742 | | 3/2003 | |
| WO | WO 03025742 | * | 3/2003 | G06F 9/445 |

OTHER PUBLICATIONS

Kaplan et al. "A Comparison of Queueing, Cluster and Distributed Computing Systems", Jun. 1994, NASA.*

(Continued)

*Primary Examiner* — Anna Deng
*Assistant Examiner* — Junchun Wu
(74) *Attorney, Agent, or Firm* — Robert D. Shedd

(57) ABSTRACT

A system and method for resolving upgrade conflicts in a content distribution system is disclosed. The present principles resolve upgrade conflicts by assigning a priority level to each upgrade and using these priorities to determine whether one or more already running upgrades should be interrupted in favor of a newly launched upgrade. If it is determined that the already running upgrades should not be interrupted, the new upgrade is terminated without attempting an upgrade. If it is determined that the already running upgrades should be interrupted, a signal is sent to kill the already running upgrade processes, causing the already running upgrades to safely exit. Further embodiments include ignoring kill signals at certain times during the upgrade process to ensure system stability.

14 Claims, 5 Drawing Sheets

(56) References Cited

U.S. PATENT DOCUMENTS

| | | |
|---|---|---|
| 2002/0152467 A1 | 10/2002 | Fiallos |
| 2003/0005419 A1* | 1/2003 | Pieper et al. .................. 717/141 |
| 2004/0003266 A1* | 1/2004 | Moshir et al. ................. 717/174 |
| 2005/0071577 A1* | 3/2005 | Dias et al. ..................... 711/151 |
| 2006/0288344 A1* | 12/2006 | Brodersen et al. ............ 717/168 |
| 2007/0234343 A1* | 10/2007 | Gouge et al. .................. 717/174 |
| 2008/0196019 A1* | 8/2008 | Meller et al. .................. 717/168 |
| 2009/0328026 A1* | 12/2009 | Yamashita et al. ............ 717/170 |

OTHER PUBLICATIONS

Ranganathan et al. "An infrastructure for context-awareness based on first order logic", Nov. 2003, Springer-Verlag.*

* cited by examiner

SYSTEMS AND METHODS FOR INTERRUPTING UPGRADES OF CONTENT DISTRIBUTION SYSTEMS

RELATED APPLICATION INFORMATION

This application claims the benefit, under 35 U.S.C. §365 of International Application PCT/US2009/004957, filed Sep. 1, 2009, which was published in accordance with PCT Article 21(2) on Jul. 15, 2010 in English and which claims the benefit of U.S. provisional patent application No. 61/204,873, filed Jan. 12, 2009.

TECHNICAL FIELD

The present invention relates to content distribution, and more particularly to systems and methods for interrupting software upgrades for content distribution system client receivers on a network.

BACKGROUND

Content distribution systems for televisions and other types of video/audio systems have evolved into complex systems that interact through networks. These types of systems can even use the Internet and telephone systems to distribute content. For example, a television content distribution system for multiple dwelling units can utilize Internet Protocol (IP) for the delivery of television content and services. These systems can be comprised of one or more gateway server devices that interact with different types of settop box (STB)-client receivers. Thus, there can be hundreds of receivers of different types and models that need to be updated and/or maintained on a regular basis. For example, operational software may need to be downloaded from a server to various receiver clients to keep the clients up-to-date.

Upgrades are typically used to fix bugs or add features to products already in the field. Sometimes, several types of upgrades may try to occur at the same time, either accidentally or deliberately. Previous upgrade methods would prevent conflicts by implementing a lock system so that once one upgrade had started, no new update could occur until the previous one had finished.

SUMMARY

Embodiments of the present invention include a system and method for resolving upgrade conflicts in a content distribution system. The present principles resolve upgrade conflicts by assigning a priority level to each upgrade and using these priorities to determine whether an already running upgrade should be interrupted in favor of a newly launched upgrade. In this manner, embodiments of the present invention run only the latest received upgrade, having the highest priority.

In one embodiment, the priority levels are assigned based on the type of upgrade being performed. If it is determined that the already running upgrade(s) should not be interrupted, the new upgrade is terminated without attempting an upgrade. If it is determined that the already running upgrade(s) should be interrupted, a signal to kill the already running upgrade(s) is sent, causing the already running upgrade(s) to safely exit. The new upgrade can then continue its process by downloading upgrade information from a content distribution server (if needed) and, upon completion of the download, finishing the second upgrade process.

Further embodiments of the present invention include ignoring kill signals at certain times during the upgrade process. For example, in one embodiment the new upgrade process can ignore any kill signals until after the kill signal is sent to the already running upgrade process(es), at which time the new upgrade process listens for kill signals. In another embodiment, an upgrade process ignores kill signals while downloading is in progress and listens for kill signals upon completion of the download. In yet another embodiment, the new upgrade process ignores kill signals while resending the kill signal to the already running upgrade(s) and listens for kill signals after the kill signal is sent.

In a further embodiment, after the kill signal is sent to the already running upgrade(s) and before continuing with the new upgrade, the process includes determining if the sent kill signal was ignored by the already running upgrade(s). If the kill signal was not ignored, the process includes continuing the new upgrade. If the kill signal was ignored, the process includes waiting for at least one of the already running upgrades to begin listening for kill signals, resending the kill signal to the already running upgrades, and continuing with the current upgrade.

One implementation of the present principles includes multiple types of upgrades/levels of priority (e.g., three levels). The first can be a periodic upgrade, which is an upgrade that occurs at regular periodic intervals. Periodic upgrades are given a low priority and will not interrupt any already running upgrade. The second can include a rescue upgrade launched to restore a system after an error occurs. Rescue upgrades are given a middle priority and will interrupt any already running upgrade except for another running rescue upgrade. The third can be an upgrade forced by a user. Forced upgrades are given the highest priority and will interrupt any already running upgrade.

These and other features and advantages will become apparent from the following detailed description of illustrative embodiments thereof, which is to be read in connection with the accompanying drawings.

BRIEF DESCRIPTION OF THE DRAWINGS

The teachings of the present invention can be readily understood by considering the following detailed description in conjunction with the accompanying drawings, in which.

Figure 1:
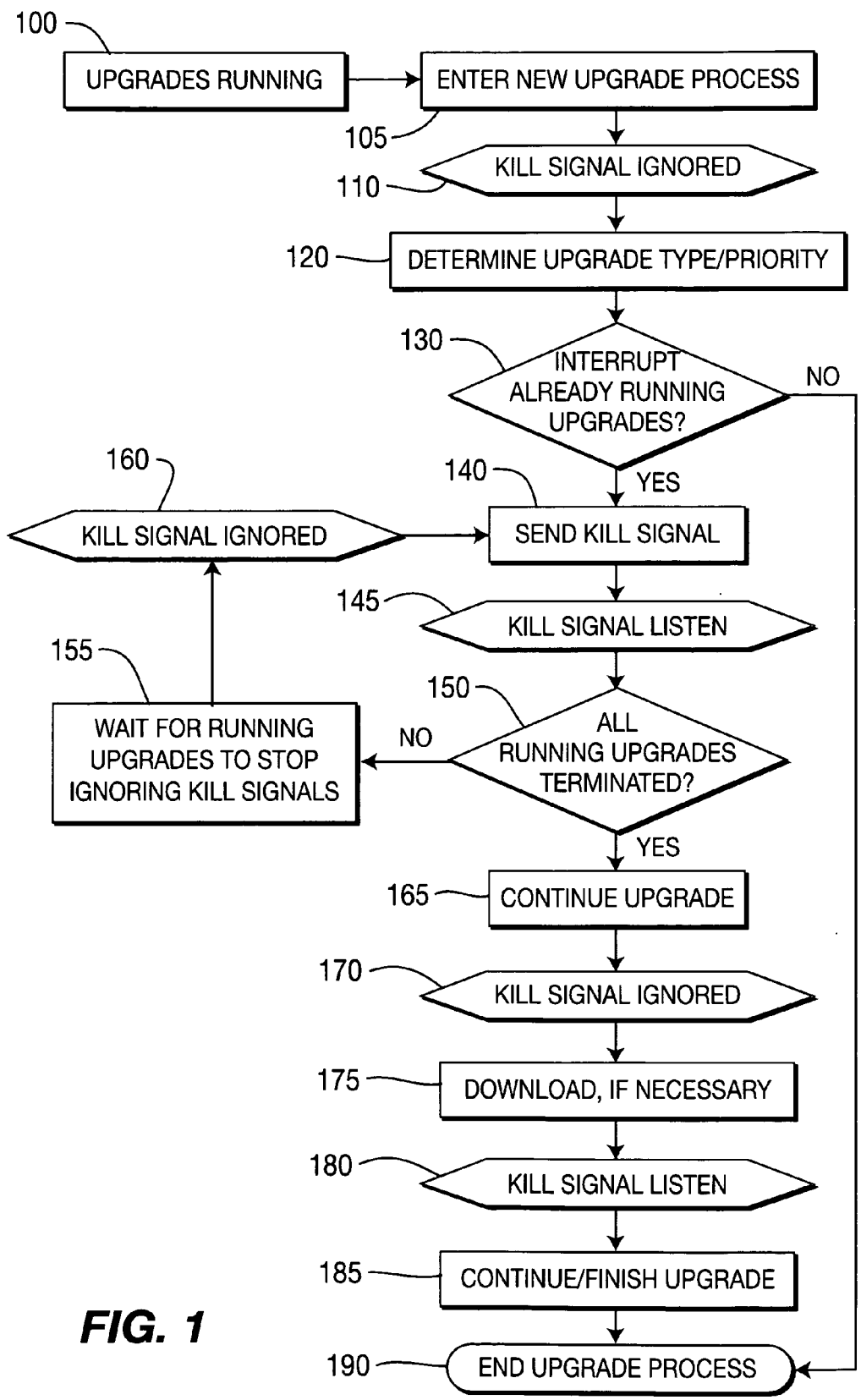
FIG. 1 is a block/flow diagram depicting an overview of the present principles.

It should be understood that the drawings are for purposes of illustrating the concepts of the invention and are not necessarily the only possible configuration for illustrating the invention. To facilitate understanding, identical reference numerals have been used, where possible, to designate identical elements that are common to the figures.

DETAILED DESCRIPTION

Embodiments of the present invention resolve upgrade conflicts by allowing an upgrade of higher importance to interrupt an already running upgrade of lower importance. The finished implementation allows many upgrade requests to be handled as expected, regardless of the frequency of the requests, thus allowing for a more robust upgrade process. The present principles assign each upgrade a priority level that is used to determine if a newly launched upgrade should override an already running upgrade or if the new upgrade should not be attempted and allow the already running upgrade to continue. If it is determined that the new upgrade has a higher priority than the already running upgrade, a signal is sent to the already running upgrade which causes it to exit and abandon that upgrade. If the already running upgrade has a higher priority than the new upgrade, the newly launched upgrade will not run.

In an exemplary embodiment, multiple levels of upgrades can exist; for example, periodic (lowest level), rescue, and forced (highest level), among others. It should be appreciated that other embodiments can employ any number of priority levels. A periodic upgrade occurs at regular intervals and is the normal upgrade state. As it's the lowest level upgrade, it will not interrupt any already running upgrade. Thus, if any other upgrade is already running when the periodic upgrade tries to launch, the periodic upgrade will not run. A rescue upgrade is used if a problem occurs that compromises the viability of the current implementation and new data is needed to restore the system. As a result, this upgrade has a higher priority and will interrupt any already running periodic or forced upgrade. However, a rescue upgrade will not interrupt another already running rescue upgrade. A forced upgrade is of the highest priority and will interrupt any already running upgrade, including another forced upgrade. In this manner, the present principles allow for quicker operation and less duplication of resources.

Embodiments of the present invention further ensure stability of the system throughout the conflict resolution process by providing the capability to temporarily ignore the signal to kill an upgrade. This functionality allows an already running upgrade to ignore a kill signal sent to it during periods where the running upgrade cannot safely and stably exit, for example, while that upgrade is performing particular operations such as downloading. In this manner, the present principles provide a priority-based conflict resolution scheme, which allows a running upgrade to be interrupted in favor of a newly launched upgrade, without sacrificing the stability of the system.

As used in this application, the term "component" is intended to refer to hardware, software, or a combination of hardware and software in execution. For example, a component can be, but is not limited to being, a process running on a processor, a processor, an object, an executable, and/or a microchip and the like. By way of illustration, both an application running on a processor and the processor can be a component. One or more components can reside within a process and a component can be localized on one system and/or distributed between two or more systems.

The functions of the various elements shown in the figures can be provided through the use of dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), and non-volatile storage. Moreover, all statements herein reciting instances and embodiments of the invention are intended to encompass both structural and functional equivalents. Additionally, it is intended that such equivalents include both currently known equivalents as well as equivalents developed in the future (i.e., any elements developed that perform the same function, regardless of structure).

Thus, for example, it will be appreciated by those skilled in the art that the block diagrams presented herein represent conceptual views of illustrative system components and/or circuitry embodying the principles of the invention. Similarly, it will be appreciated that any flow charts, flow diagrams, state transition diagrams, pseudocode, and the like represent various processes which can be substantially represented in computer readable media and so executed by a computer or processor, whether or not such computer or processor is explicitly shown.

In the following description, for purposes of explanation, numerous specific details are set forth in order to provide a thorough understanding of the subject matter. In other instances, well-known structures and devices are shown in block diagram form in order to facilitate describing the embodiments. These details are provided for illustrative purposes only and should not be interpreted as limiting the scope of the present invention. It should be evident that present principles can be practiced without these specific details.

Reference will now be made in specific detail to the drawings in which like reference numerals identify similar or identical elements throughout the several views, and initially to FIG. 1. FIG. 1 is a block/flow diagram representing an overview of how a system/method implementing the present principles handles a newly launched upgrade process while one or more upgrade processes are already running on the system. The system/method begins in block 100 with one or more upgrades already running and proceeds to block 105 where the new upgrade process is launched. Upon launch, the new upgrade ignores all kill signals directed towards it, as shown in block 110.

In block 120, the type/priority of the new upgrade is determined. More details about possible types and priorities will be explained later with reference to FIG. 2. Once the type/priority of the upgrade has been established, in block 130, the system/method determines whether the currently running upgrades should be interrupted in favor of the newly launched upgrade. The priority level of the running upgrade processes should already be known at this time since it was determined when those upgrades initially launched (see FIG. 1B). If the running upgrades should not be interrupted, the new upgrade process will not attempt the upgrade. Thus, the system/method proceeds to block 190 where the new upgrade process is terminated, allowing the already running upgrades to continue.

If the upgrades already running should be interrupted, in block 140, a kill signal is sent to those upgrades. In one embodiment, the kill signal is not used for any other purpose in the rest of the system or application. Having a dedicated kill signal that is not used for any other purpose will avoid having spurious interruptions. When the kill signal is received by an already running upgrade, it causes the upgrade to safely exit, allowing the new upgrade to run without conflict. After the kill signal is sent, in block 145 the new upgrade stops ignoring kill signals and begins listening for kill signals directed towards it.

In one embodiment, the system/method will then move to block 150 to ensure that the already running upgrades have terminated. If the upgrades have safely terminated the system/method proceeds to block 165 where the new upgrade continues its upgrade procedure. If one or more of the already running upgrades have not terminated, this means that the kill signal was ignored by these upgrades. In this case, the new upgrade does not begin to run and the system/method proceeds to block 155 where it waits for the already running upgrades to stop ignoring kill signals. These upgrades can stop ignoring kill signals by either beginning to listen for kill signals, as demonstrated for example in block 145, or by ending the first upgrade process, as shown in block 190. Once one or more of the running upgrades has stopped ignoring kill signals, the second upgrade ignores kill signals again, shown in block 160, and the system/method returns to step 140 where kill signal is resent to the running upgrades. If all already running upgrades have already terminated, this step can be skipped. At this point, the system can once again perform the check in block 150, as shown in FIG. 1, or can proceed directly to block 165.

In either case, at some point after the kill signal is sent, the new upgrade will continue its procedure. In one embodiment, continuing the new upgrade involves downloading upgrade information from a server. Examples of upgrade information include, but are not limited to, operational software, system patches and upgrade instructions. In this embodiment, the system/method moves from block 165 to block 170, where the new upgrade once again ignores kill signals. Then, in block 175, the new upgrade downloads the upgrade information from the server. Kill signals are ignored during the download process because to interrupt an upgrade in the process of downloading could cause system instability. Once the download is complete, the new upgrade listens for kill signals again in block 180. Then, as demonstrated in block 185, the new upgrade will then continue with the upgrade until the upgrade is complete. At this point the system/method moves to block 190 and ends the upgrade process.

Although not displayed in FIG. 1, it should be noted that at any point during this process, the new upgrade can receive a kill signal by a newer upgrade. If this signal is received while the new upgrade is listening for kill signals, the system/method proceeds to block 190 and ends the new upgrade. If a kill signal is received while the new upgrade is ignoring kill signals, the new upgrade continues the process as if no signal was received.

In one embodiment, if an old upgrade was not successful, it can still be in the upgrade state but in a retry mode. The old upgrade will stay in this retry mode until the upgrade is successful or until the maximum number of retries has occurred. A signal sent to kill an upgrade in a retry mode will interrupt the upgrade and remove it, allowing a new upgrade to take over.

Figure 1B:
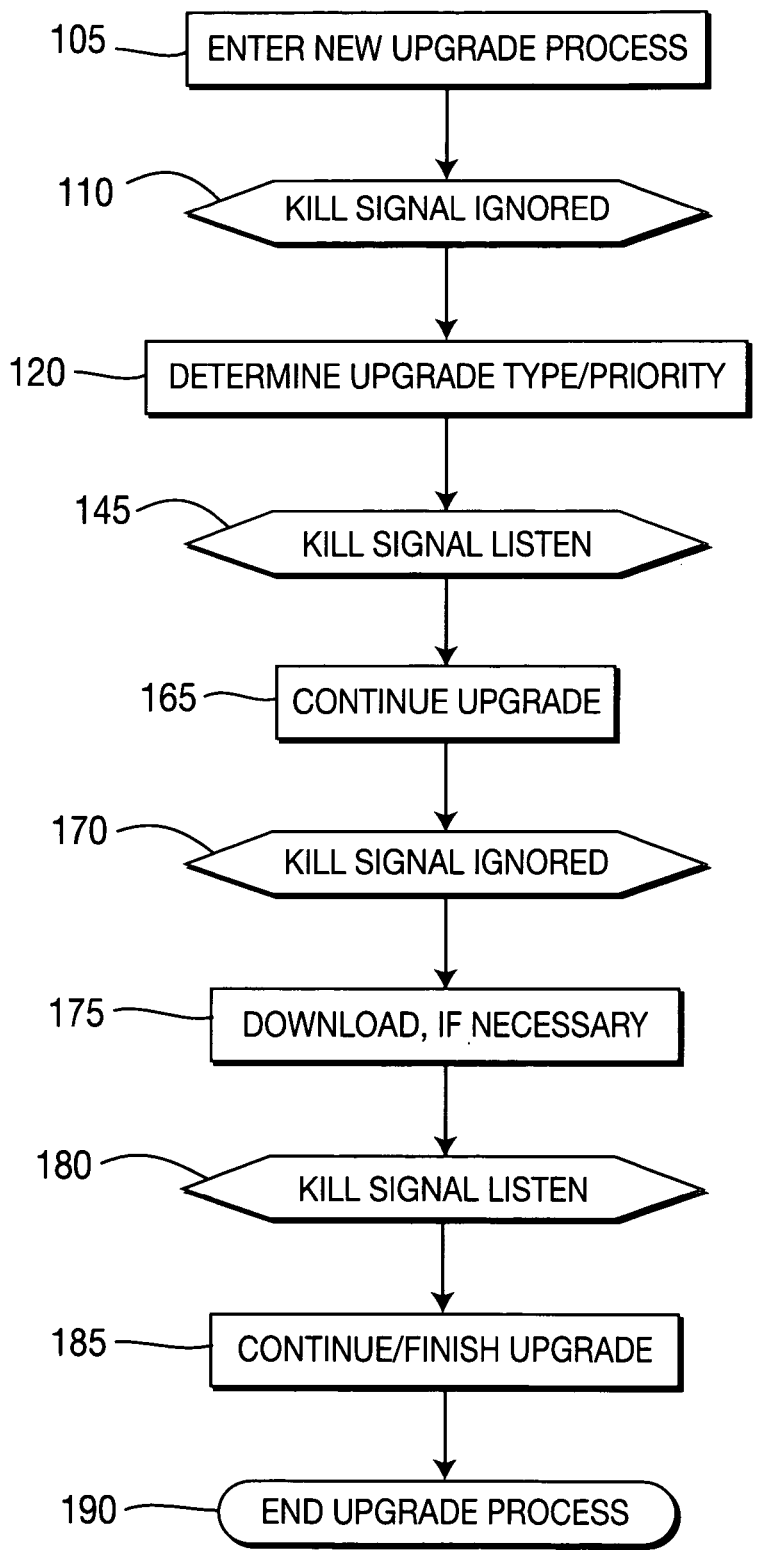

It should be appreciated that FIG. 1 represents the process when a new upgrade is launched while one or more other upgrades are already running. When an upgrade begins to run while no other upgrades are running, the upgrade does not need to perform all of these same actions. FIG. 1B demonstrates how a system/method implementing the present principles handles a newly launched upgrade while no other upgrade is already running. FIG. 1B begins in block 100 by entering the upgrade process. As shown in block 110, upon launch, the upgrade process ignores kill signals. In block 120, the upgrade type and priority are determined.

The system/method then proceeds straight to block 145, where the upgrade begins to listen for kill signals. Then the system/method continues to block 165 where the upgrade continues the upgrade process. If downloading is necessary, the upgrade then ignores kill signals, performs the necessary downloads and listens for kill signals again, as shown in blocks 170, 175 and 180, respectively. The system/method then finishes the upgrade in block 185 and ends the upgrade process in block 190. As noted above, if the upgrade process receives a kill signal at any point when it is listening for kill signals, it immediately proceeds to block 190 and ends that upgrade.

Figure 2:
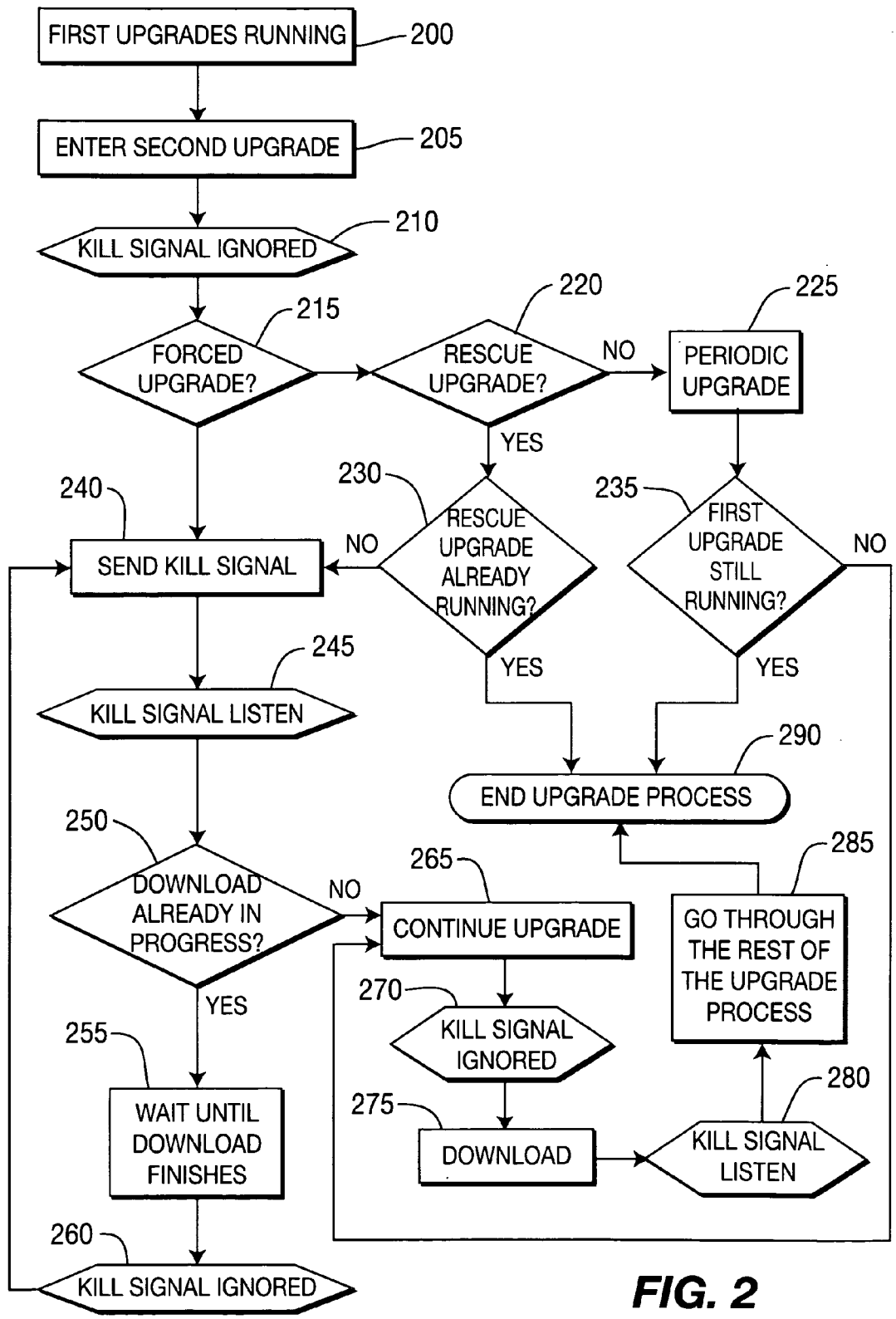
FIG. 2 is a block/flow diagram of one embodiment of a system/method to interrupt upgrades to a content distribution system in accordance with the present principles.

FIG. 2 is a block/flow diagram detailing one embodiment of the present principles. It should be noted, that FIG. 2 and the following description of FIG. 2 refer to a "first upgrade" and a "second upgrade." These terms are used for descriptive purposes only, to indicate the temporal relationship between the two upgrades, i.e., the second upgrade is launched at a time after the first upgrade. The use of these terms and should not be read to limit the scope of the present principles to only two upgrades. Thus, the present principles include the ability to only perform the latest, high priority upgrade even if many upgrade start procedures are sent in quick succession.

FIG. 2 begins in block 200 with a first upgrade already running. The system/method then proceeds to block 205, where a second upgrade process is entered. After entering the second upgrade, the second upgrade temporarily ignores any kill signals directed towards it, as shown in block 210. Blocks 215, 220 and 225, detail how this embodiment determines the type of upgrade and priority level of the second upgrade. This embodiment classifies upgrades into three types: forced upgrades, rescue upgrades and periodic upgrades. In block 215, the system checks if the upgrade is a forced upgrade. A forced upgrade is an upgrade that was manually initiated by a user. As such, it is of the highest priority and will interrupt any already running update, including another forced update. Therefore, if the upgrade is determined to be a forced upgrade, the system proceeds straight to block 240.

If the upgrade is not a forced upgrade, the system/method continues to block 220 and determines if the upgrade is a rescue upgrade. A rescue upgrade is used if the viability of the current implementation has been compromised and new data is needed to restore the system. As a result, rescue upgrades have a high priority and will interrupt any already running periodic or forced upgrade. However, one rescue upgrade will not interrupt another already running rescue upgrade. Thus if the upgrade is a rescue upgrade, the system/method will check whether another rescue upgrade is running, as shown in block 230. If, in block 230, it is determined that no other rescue upgrade is running, the system continues to block 240. However, if there is another rescue upgrade running, the system proceeds to block 290 and ends the second upgrade process.

Finally, if it is determined in block 220 that the upgrade is not a rescue upgrade, then the upgrade is a periodic upgrade, as demonstrated by block 225. A periodic upgrade occurs at regular intervals and is the lowest level upgrade. As such, it will not interrupt any already running upgrade. Therefore, if block 225 is reached, the system/method continues to block 235 and checks to see if the first upgrade is still running. If it is, then the system/method proceeds to block 290 and ends the second upgrade process. If the first upgrade is no longer running, then the periodic upgrade can run and, hence, the system/method proceeds to block 265.

Therefore, in this embodiment, two scenarios exist where a first, already running upgrade should be interrupted. The first scenario is if the second upgrade is a forced upgrade because forced upgrades are of highest priority and interrupt any running upgrade. The second scenario is if the second upgrade is a rescue upgrade and the first upgrade is not a rescue upgrade. In all other scenarios, the second upgrade does not run and the first upgrade continues as usual. This is summarized in Table 1 below:

TABLE 1

| | | Second Upgrade | | |
|---|---|---|---|---|
| | | Forced | Rescue | Periodic |
| First Upgrade | Forced | Kill First | Kill First | Do not run Second |
| | Rescue | Kill First | Do not run Second | Do not run Second |
| | Periodic | Kill First | Kill First | Do not run Second |

Similar to the system/method shown in FIG. 1, if it is determined that the first, running upgrade should be interrupted in FIG. 2, a kill signal is sent to the first upgrade in block 240. After sending the kill signal, in block 245 the second upgrade listens for kill signals directed to it. As described above, at this point the system/method then verifies that the kill signal was not ignored by the already running upgrade. As shown in block 250, this embodiment specifically determines if the first upgrade has a download already in progress. If there is no download in progress, the second upgrade continues its upgrade process in block 265. However, if the first upgrade does have a download in progress, this means that the first upgrade ignored the kill signal (as demonstrated in FIG. 1 blocks 170-180, an upgrade will ignore kill signals during a download process). In this case, the system/method proceeds to block 255 where the second upgrade waits for the first upgrade to complete the download and stop ignoring kill signals. Then, the second upgrade ignores kill signals in block 260, and returns to block 240 to resend the kill signal. The second upgrade then listens for kill signals, block 245, and will continue to block 265 since the download has completed.

While the second upgrade is continuing its upgrade process, it may need to download upgrade information from a server. At this point, the second upgrade ignores kill signals, block 270, and begins downloading the necessary information in block 275. Once the download has completed, the second upgrade listens for kill signals again, block 280, and finishes the rest of the upgrade process, block 285. The upgrade process then ends in block 290.

As stated above, although the preceding description and drawings refer to a "first upgrade" and a "second upgrade," embodiments of the present invention include the ability to handle multiple upgrades launched in quick succession. For example, if, while the second process is waiting for the first upgrade to finish its download, a third process starts, the second process will be killed if the third process is of higher priority. Further, if a fourth upgrade is launched while the third upgrade is waiting for a first or second upgrade and the fourth upgrade is of higher priority than the third, the fourth will kill the third upgrade, and so on.

Figure 3:
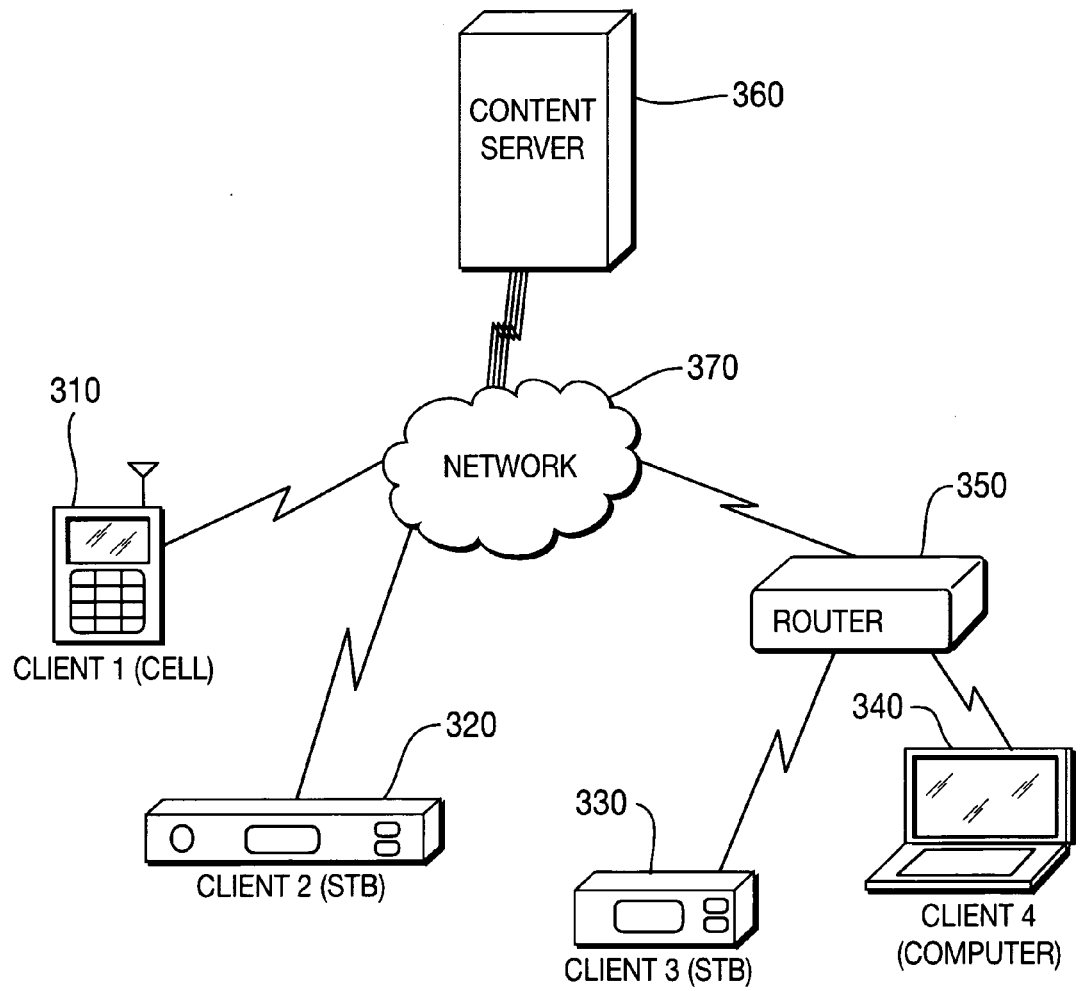
FIG. 3 is an exemplary content distribution system in which embodiments of the present invention can be implemented.

FIG. 3 depicts one example of a content distribution system which can implement the present principles. As demonstrated in FIG. 3, the content distribution system can include numerous client receivers of different types and/or models. These receivers can include, for example, a cellular device 310, a set top box 320 and 330, and a computer device 340. As further demonstrated in FIG. 3, these receivers connect to the content server 360 through a network 370. The receivers can connect to the network directly, as demonstrated by the connections made by cellular device 310 and set top box 320. Alternatively, the receivers can connect to the network 370 through a router 350 or other such switching device, as demonstrated by the connections made by set top box 330 and computer 340.

The upgrades and upgrade conflict resolution procedure discussed herein can be initiated by/through the clients 310-340 themselves or by the content server 360. In either case, the upgrades and the upgrade conflict resolution procedure run on the clients 310-340 to upgrade applications or system software present on the client devices 310-340. When the clients 310-340 need to download upgrade information (see e.g. block 175), they do so via the connection to the client server 360 through the network 370.

Figure 4:
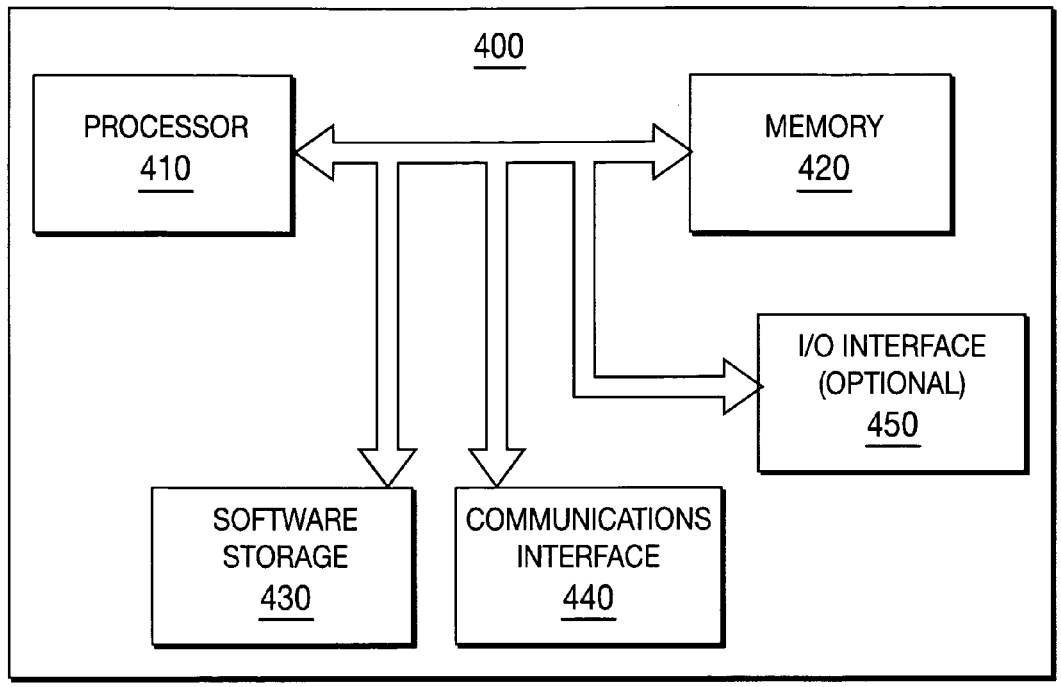
FIG. 4 is an exemplary receiver in which embodiments of the present invention can be implemented.

FIG. 4 is an exemplary content distribution system client receiver implementing the present principles. The client receiver device, 400, includes a processor 410 and memory 420. The processor 410 executes at least the various upgrade processes which run on the receiver 400 and the conflict resolution procedure described herein. The processor 410 can also execute applications which can run on the receiver device 400 as well as the operating system of the receiver device 400. Although only one processor is shown in FIG. 4, receivers embodying the present invention can include more than one processor. The memory 420 can store at least information related to the upgrade processes, such as the type and priority of the running upgrade(s), and the upgrade information downloaded from the content distribution server 360. The memory can also store information related to other applications running on the device 400.

The receiver device 400 can also include software storage 430 which stores the various applications and system processes which can run on the device 400. These applications and system processes can be the target of one or more upgrade processes. In addition, the receiver 400 further includes a communications interface 440. The communications interface 440 can be used at least to communicate with one or more networks 360 to download upgrade information from the content distribution server 360. Further embodiments of the receiver device can include an input/output interface 450 which allows a user to interact with the device.

Figure 5:
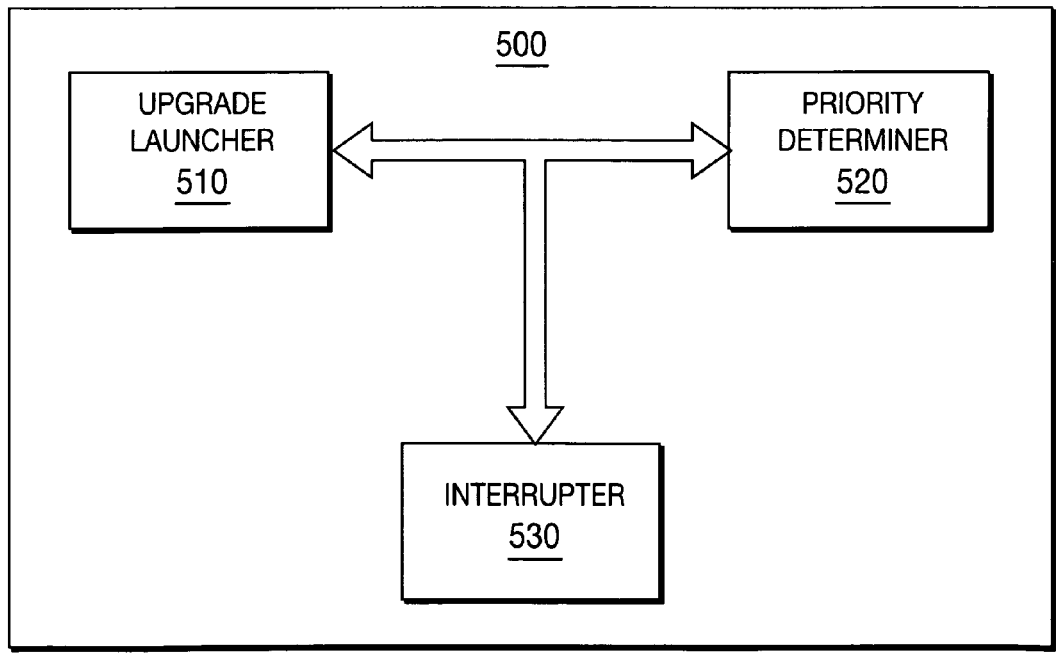
FIG. 5 represents an upgrade conflict resolution system in accordance with one embodiment of the present principles.

FIG. 5 demonstrates one embodiment of a conflict resolution system in accordance with the present principles. The conflict resolution system 500 includes an upgrade launching module 510, which is configured to launch upgrades on a client receiver 400 in a content distribution system. In one embodiment, the upgrade launching module 510 is stored on the content server 360 and communicates with the client receiver 400 via a network 370 or other communications interface. In another embodiment, the upgrade launching module 510 is stored on the client receiver 400 in memory 420 or software storage 430. The conflict resolution system 500 can also include a priority determining module 520 configured to identify the priority of the upgrade launched and determine whether an already running upgrade should be interrupted in favor of the newly launched upgrade. In one embodiment, the priority determining module 520 is stored on the client receiver 400 in memory 420 or software storage 430. The conflict resolution system 500 can further comprise an interrupter module 530 configured to send kill signals to an upgrade which should be interrupted. In one embodiment, the interrupter module 530 is stored on the client receiver 400 in memory 420 or software storage 430.

It is to be appreciated that the systems and/or methods of the embodiments can be utilized in content and/or service distribution facilitating computer components and non-computer related components alike. Further, those skilled in the art will recognize that the systems and/or methods of the embodiments are employable in a vast array of electronic related technologies, including, but not limited to, computers, broadcast content/service receivers, and/or mobile devices, and the like.

Having described preferred embodiments for systems and methods interrupting upgrades of content distribution systems (which are intended to be illustrative and not limiting), it is noted that modifications and variations can be made by persons skilled in the art in light of the above teachings. It is therefore to be understood that changes can be made in the particular embodiments of the invention disclosed which are within the scope of the invention as outlined by the appended claims. While the forgoing is directed to various embodiments of the present invention, other and further embodiments of the invention can be devised without departing from the basic scope thereof.

The invention claimed is:

1. A method for resolving upgrade conflicts in a content distribution system, comprising:
   entering a first upgrade process on a content distribution system client receiver, the first upgrade process ignores kill signals until after a priority level is assigned to the first upgrade process; assigning the priority level to the first upgrade process;
   continuing with the first upgrade process until the first upgrade process is interrupted or completed;
   entering a second upgrade process on the content distribution system client receiver; assigning a priority level to the second upgrade process;
   determining whether the first, already running upgrade process should be interrupted based on the priority levels of the first and second upgrades processes;
   if the already running upgrade process should not be interrupted, ending the second upgrade process and continuing with the already running upgrade process;
   if the already running upgrade process should be interrupted, sending a signal to kill the already running upgrade process, causing the already running upgrade process to safely exit, and then continuing with the second upgrade process until the second upgrade process is interrupted or completed.

2. The method of claim 1, wherein continuing with the first upgrade process further comprises:
   downloading upgrade information from a content distribution server; and
   upon completion of the download, continuing with the first upgrade process.

3. The method of claim 2, wherein the first upgrade process ignores kill signals while the downloading is in progress and listens for kill signals upon completion of the download.

4. The method of claim 1, wherein after entering the second upgrade process, the second upgrade process ignores any kill signals until after the kill signal is sent to the first upgrade process, at which time the second upgrade process listens for kill signals.

5. The method of claim 1, wherein continuing with the second upgrade process further comprises:
   downloading upgrade information from a content distribution server; and
   upon completion of the download, continuing with the second upgrade process.

6. The method of claim 5, wherein the second upgrade process ignores kill signals while the downloading is in progress and listens for kill signals upon completion of the download.

7. The method of claim 1, further comprising:
   after sending the signal to kill the first upgrade process and before continuing with the second upgrade process, determining if the sent kill signal was ignored by the first upgrade process; and
   if the kill signal was not ignored, continuing with the second upgrade process;
   if the kill signal was ignored, waiting for the already running upgrade process to begin listening for kill signals, resending the kill signal to the already running upgrade process, and continuing with the current upgrade process.

8. The method of claim 7, wherein the second upgrade process ignores kill signals while resending the kill signal to the first upgrade process and listens for kill signals after the kill signal is sent.

9. The method of claim 1, wherein the priority levels are assigned based on the type of upgrade process being performed.

10. The method of claim 9, wherein an upgrade process that occurs at regular periodic intervals is given a low priority and will not interrupt any already running upgrade process.

11. The method of claim 9, wherein a rescue upgrade process launched to restore a system after an error occurs, is given a middle priority and will interrupt any already running upgrade process except for another running rescue upgrade process.

12. The method of claim 9, wherein an upgrade process forced by a user, is given the highest priority and will interrupt any already running upgrade process.

13. The method of claim 1, wherein the signal sent to kill the first upgrade process is not used for any other purpose in the system or application.

14. The method of claim 7, wherein a plurality of upgrades processes are running when the second upgrade process is entered and the following is performed for each of the plurality of already running upgrade processes:
   determining whether the already running upgrade process should be interrupted based on priority levels,
   if the already running upgrade process should not be interrupted, ending the second upgrade process and continuing with the already running upgrade process, and
   if the already running upgrade process should be interrupted, sending a signal to kill the already running upgrade process, causing the already running upgrade process to safely exit, and then continuing with the second upgrade process until the second upgrade process is interrupted or completed.

* * * * *